Nov. 8, 1955     R. E. LONDON     2,722,876
SOIL PULVERIZER

Filed Sept. 8, 1952     2 Sheets-Sheet 1

Robert Earl London
INVENTOR.

BY *Clarence A. O'Brien*
*and Harvey B. Jacobson*
Attorneys

Nov. 8, 1955   R. E. LONDON   2,722,876
SOIL PULVERIZER
Filed Sept. 8, 1952   2 Sheets-Sheet 2

Robert Earl London
INVENTOR.

United States Patent Office 2,722,876
Patented Nov. 8, 1955

2,722,876
SOIL PULVERIZER

Robert Earl London, Corpus Christi, Tex.

Application September 8, 1952, Serial No. 308,313

1 Claim. (Cl. 97—47.62)

This invention relates to new and useful improvements and structural refinements in soil pulverizers, and the principal object of the invention is to provide a pulverizer of the character herein described which is adapted for attachment to the usual implement lift mechanism of a tractor and which is equipped with means for varying the operating depth of the soil pulverizing prongs, regardless of any irregularities in the ground over which the tractor and pulverizer travel.

The object is achieved by the provision of a ground engaging gauge wheel on the pulverizer and means for raising and lowering the gauge wheel so as to effect the desired adjustment in the operating depth of the pulverizer prongs.

Some of the advantages of the invention reside in its simplicity of construction, in its efficient and expeditious operation, in its durability, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Figure 1:
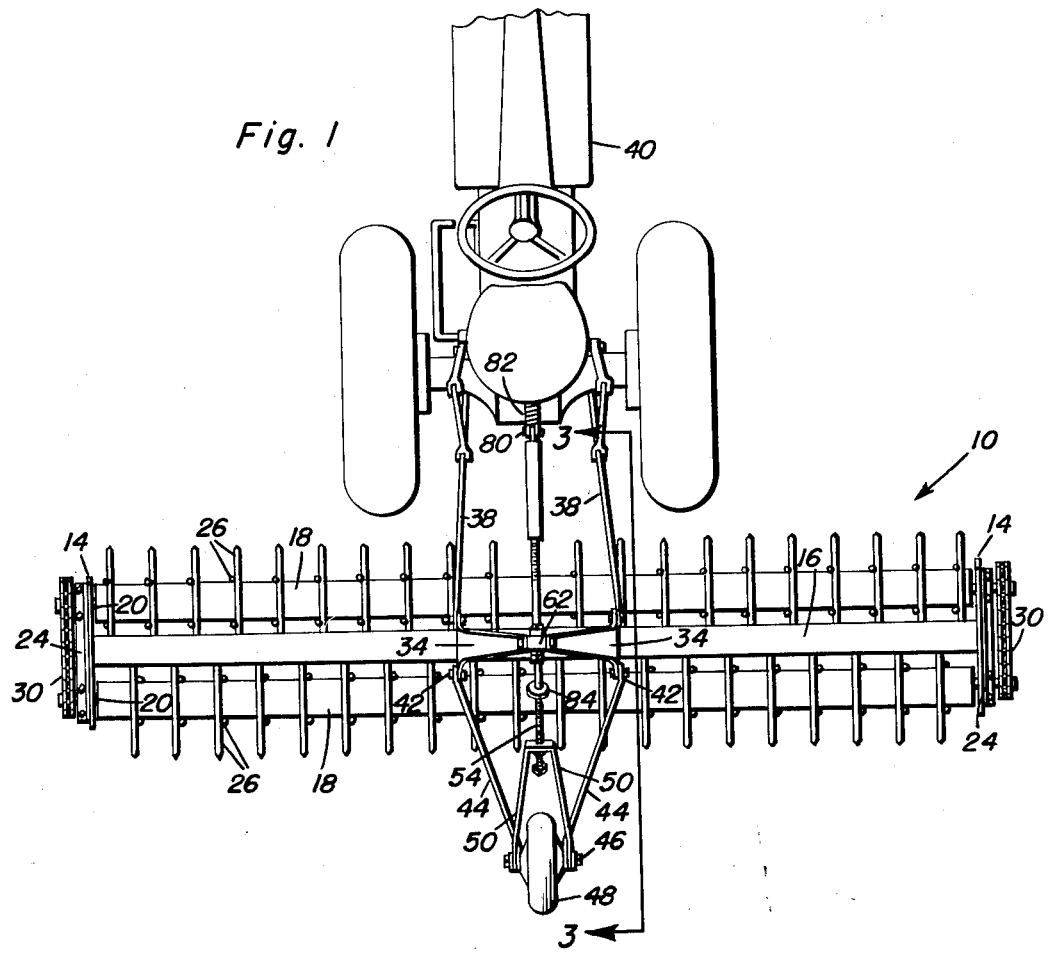
Figure 1 is a top plan view of the invention connected to a tractor.
Figure 5:
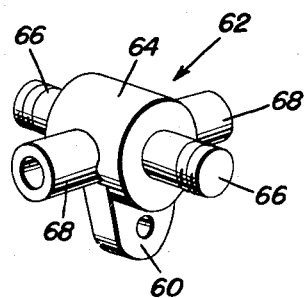
Figure 5 is a perspective view of a combined trunnion and bearing member used in the invention.
Figure 2:
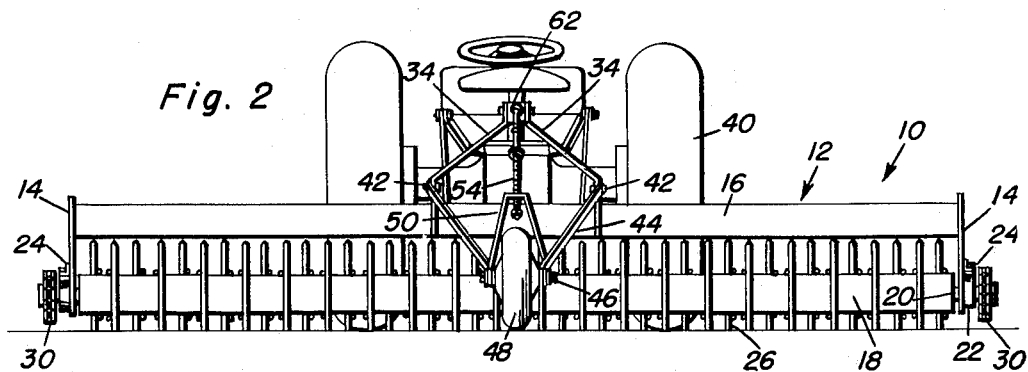
Figure 2 is a rear elevational view thereof.

Referring now to the accompanying drawings in detail, the soil pulverizer is designated generally by the reference character 10 and embodies in its construction a transversely elongated frame 12 consisting of a pair of plates 14 secured to the opposite ends of a tubular cross-member 16, as shown.

Figure 3:
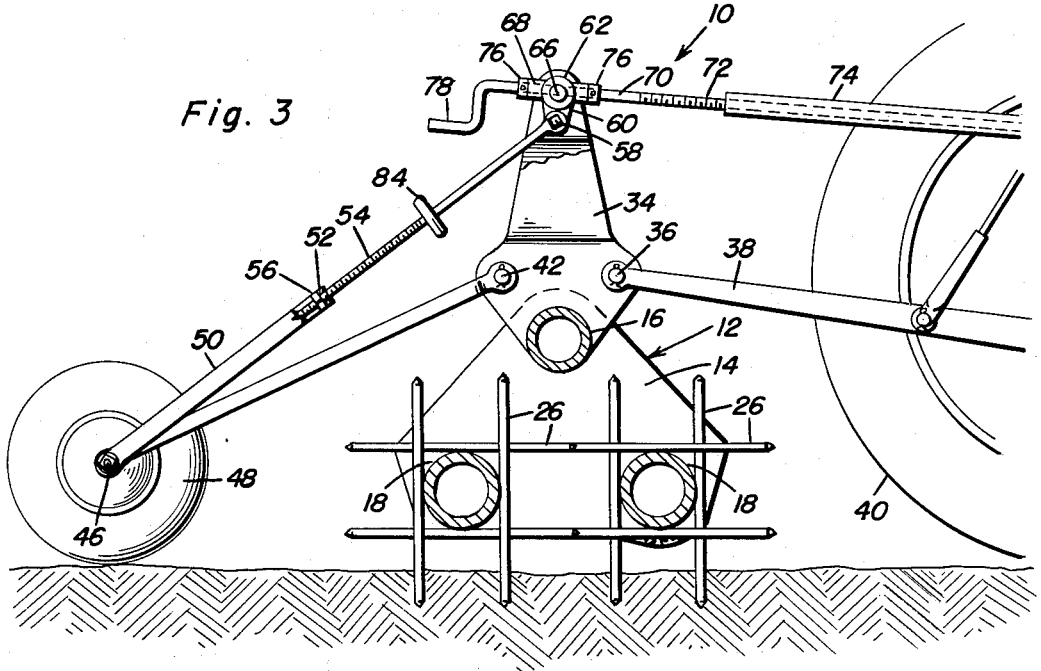
Figure 3 is a fragmentary sectional view, on an enlarged scale, taken substantially in the plane of the line 3—3 in Figure 1.
Figure 4:
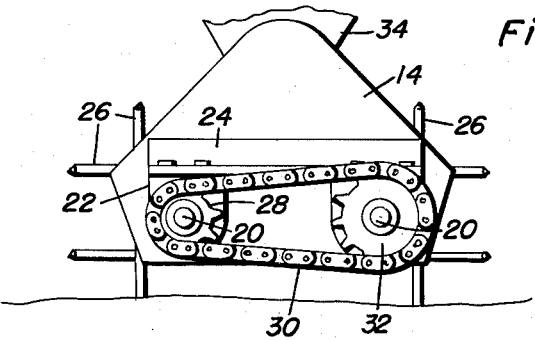
Figure 4 is a fragmentary end view of the pulverizer.

A pair of spaced parallel, cylindrical shafts 18 are rotatably mounted in the frame 12 by being provided at the ends thereof with trunnions 20 which are rotatably journaled in bearings 22 fixed to angle bars 24 on the plates 14, and sets of soil engaging prongs 26 are secured by welding, or the like, tangentially to the shafts 18, as is best shown in Figure 3. It is to be noted that the prongs 26 on one of the shafts are transversely staggered and radially overlapped with respect to the prongs on the other shaft, and means are provided for rotating the two shafts at respectively different speeds, so that when the implement travels over the ground, a certain amount of slippage or dragging results, to better effect the pulverizing operation. These means consist of a pair of relatively small sprockets 28 which are secured to the trunnions 20 of one of the two shafts 18 and are operatively connected by endless chains 30 to a pair of relatively large sprockets 32 secured to the trunnions of the other shaft. In that manner, the two shafts are rotated at respectively different speeds.

A pair of transversely spaced, upwardly converging bracket members 34 are rigidly secured to an intermediate portion of the frame cross-member 16 and these brackets have pivot elements 36 thereon for connection to the usual implement lift arms 38 of a tractor 40.

Moreover, the bracket members 34 are provided with pivot elements 42 whereby a rearwardly and downwardly extending yoke 44 is connected to the bracket members. The rear end of the yoke 44 carries a transverse shaft or spindle 46 on which is mounted a rotatable, ground engaging gauge wheel 48 and which shaft also has pivotally mounted thereon a substantially U-shaped brace member or yoke 50 straddling the wheel 48 and inclining upwardly and forwardly away from yoke 44.

The bight portion of the brace member or yoke 50 is provided with a screw-threaded aperture 52 which operatively receives a screw-threaded shaft 54, a lock nut 56 being provided on the shaft 54 for locking against the bight portion of the brace member 50 when so desired. The forward or upper end of the shaft 54 is pivoted by a pin 58 to a depending, apertured ear 60 of a combined trunnion and bearing member 62 which has a substantially cylindrical body portion 64 provided with laterally projecting trunnions 66 journaled in the upper end portions of the bracket members 34.

A tubular bearing 68 extends diametrically through the body portion 64 of the member 62 and rotatably receives therein a shaft 70 which has a screw-threaded portion 72 operatively engaging a tubular rod 74.

The shaft 70 is equipped with a pair of collars 76 which are disposed at the ends of the bearing 68 and thereby prevent the shaft from shifting longitudinally, and when a handle 78, provided on the shaft 70, is rotated, the combined length of the shaft 72 and rod 74 may be increased or decreased, as desired. The forward end of the rod 74 is connected at 80 to the customary control mechanism 82 of the implement lift on the tractor.

Finally, it will be observed that a handwheel 84 is provided on the shaft 54 for rotating the same.

It will be observed from the foregoing that by simply adjusting the handle 78 so as to increase or decrease the combined length of the shaft 72 and rod 74, the position of the pulverizer mechanism with respect to the ground and with respect to the tractor lift arms 38 may be varied as desired.

Moreover, by rotating the shaft 54 by means of the handwheel 84, the gauge wheel 48 may be raised or lowered with respect to the frame 12, whereby to effect an adjustment in the operating depth of the pulverizer prongs 26.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In combination, a pair of upwardly converging brackets, means pivotally connecting the lower portions of said brackets to the power lift arms of a tractor, a combined trunnion and bearing member journaled in the upper portions of said brackets between the same, screw feed means connecting said combined member to the control of said power lift, a frame suspended from the lower portion of said brackets and carrying front and rear shafts having ground pulverizing prongs thereon, a rearwardly and downwardly inclined yoke pivoted to the lower portion of said brackets for vertical swinging adjustment thereon and carrying a ground engaging wheel therein having a spindle traversing said yoke, a second U-shaped yoke straddling said wheel and inclining upwardly and forwardly away from the first-named yoke with ends pivoted on said spindle, and a screw feed connection between said second named yoke and said combined member for feeding said second named yoke upwardly to adjust said first named yoke vertically whereby to vertically adjust said wheel.

References Cited in the file of this patent

UNITED STATES PATENTS

| | | | |
|---|---|---|---|
| Re. 23,190 | Smith | Jan. | 10, 1950 |
| 31,738 | Quinby | Mar. | 19, 1861 |
| 934,238 | Tripp | Sept. | 14, 1909 |
| 2,440,550 | Martin | Apr. | 27, 1948 |
| 2,456,693 | Fraga | Dec. | 21, 1948 |
| 2,526,396 | Nowlin | Oct. | 17, 1950 |
| 2,531,557 | Dayton | Nov. | 28, 1950 |
| 2,616,348 | Ariens | Nov. | 4, 1952 |
| 2,672,801 | Barrett | Mar. | 23, 1954 |

FOREIGN PATENTS

| | | | |
|---|---|---|---|
| 88,028 | Sweden | Dec. | 1, 1936 |